United States Patent
Olshan et al.

(10) Patent No.: US 10,885,694 B2
(45) Date of Patent: Jan. 5, 2021

(54) SYSTEM AND METHOD FOR ANIMATING VIRTUAL CHARACTERS

(71) Applicant: Activision Publishing, Inc., Santa Monica, CA (US)

(72) Inventors: Adam Olshan, Santa Monica, CA (US); Daniel Doptis, Santa Monica, CA (US); Anthony Pardee, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/539,827

(22) Filed: Aug. 13, 2019

(65) Prior Publication Data

US 2020/0219303 A1 Jul. 9, 2020

Related U.S. Application Data

(63) Continuation of application No. 13/831,333, filed on Mar. 14, 2013, now abandoned.

(51) Int. Cl.
| | |
|---|---|
| *G06T 13/40* | (2011.01) |
| *A63F 13/98* | (2014.01) |
| *A63F 13/52* | (2014.01) |
| *A63F 13/65* | (2014.01) |
| *A63F 13/825* | (2014.01) |

(52) U.S. Cl.
CPC .............. *G06T 13/40* (2013.01); *A63F 13/52* (2014.09); *A63F 13/65* (2014.09); *A63F 13/825* (2014.09); *A63F 13/98* (2014.09)

(58) Field of Classification Search
CPC .......... G06T 13/40; A63F 13/52; A63F 13/65; A63F 13/825; A63F 13/98
See application file for complete search history.

(56) References Cited

U.S. PATENT DOCUMENTS

| | | | | |
|---|---|---|---|---|
| 5,766,077 | A * | 6/1998 | Hongo | A63F 13/02 463/30 |
| 2004/0142628 | A1 * | 7/2004 | Pino | A63H 3/00 446/69 |

OTHER PUBLICATIONS

Jodie Azhar, "Creating Realistic Locomotion in the Animation of a Fantasy Creature", posted on Dec. 6, 2010, p. 1-11. http://ncca.bournemouth.ac.uk/gallery/view/427/Creating_realistic_Locomotion_in_the_Animation_of_a_Fantasy_Creature (Year: 2010).*

* cited by examiner

*Primary Examiner* — Chong Wu
(74) *Attorney, Agent, or Firm* — Klein, O'Neill & Singh, LLP

(57) ABSTRACT

System and methods for defining and applying animations to virtual characters with interchangeable body parts that may be combined to form composite virtual characters are disclosed. According to aspects of the invention, a software program running on a gaming platform comprises a plurality of virtual characters, each comprising a plurality of interchangeable body parts. An animation clip may be defined for an interchangeable body part of a first virtual character. The animation clip may be defined for the first virtual character's interchangeable body party using a virtual skeleton that has the bones of the interchangeable body part and the bones of one or more generic body parts. The defined animation clip may control one or more of the bones of the interchangeable body part and one or more of the bones of the one or more generic body parts.

7 Claims, 16 Drawing Sheets

SYSTEM AND METHOD FOR ANIMATING VIRTUAL CHARACTERS

CROSS-REFERENCE TO RELATED APPLICATION

The present application is a continuation of U.S. patent application Ser. No. 13/831,333, filed Mar. 14, 2013.

BACKGROUND OF THE INVENTION

The present invention relates generally to animating a virtual character, such as those found in video games or animated movies, and more particularly to animating a virtual character comprised of parts of other virtual characters.

Animating a virtual character typically involves building an animated three-dimensional (3D) character model that is rigged with a virtual skeleton. A character rig generally includes the character's virtual skeleton bound to the character's 3D mesh or skin. The virtual skeleton typically includes a plurality of joints and/or bones that can be manipulated to move or deform the model into different poses. The virtual skeleton provides the basic form of the virtual character. For example, a humanoid virtual character may have a virtual skeleton that has bones representing a human form (e.g., a head bone, spine bones, arm/hand bones, leg/feet bones, pelvic bones, etc.). On the other hand, a reptilian virtual character may have a virtual skeleton that has bones representing a reptile (e.g., a tail bone, four leg bones, spine bones, elongated skull and facial bones, etc.). FIG. 12, discussed in greater detail below, depicts a generic humanoid virtual skeleton 1200 comprising a torso body part 1210 and a legs body part 1220 with various bones and joints. Surfaces, which may used to convey skin, hair, texture, eyes, mouth, etc., may also be added to the virtual character.

Traditionally, a given virtual character may have one animation rig and, correspondingly, one virtual skeleton. Animators create animation clips (or animations) for the virtual character that manipulate the virtual character's joints and/or bones into various positions and poses. These animation clips can be used to define the virtual character's movements and behaviors. For example, virtual characters in a video game may have predefined animation clips associated with movements and actions such as idling, walking, running, attacking, jumping, receiving damage, casting spells, climbing, flying, speaking, using items, or any other movement or action. The animation clips may apply to and/or control all or a subset of the virtual skeleton's bones. Often, the animation clips for each virtual character will be used to impart personality to the virtual character. For example, the idling animation for virtual character A may be rigid and upright, suggesting a formal or restricted personality. On the other hand, the idling animation for virtual character B may be slouched and relaxed, suggesting a laid back personality. Virtual characters, as the term is used herein, may be non-human characters and/or objects, including monsters, animals, robots, weapons, clothing, vehicles, or any other in-game characters or objects. The animation clips defined for virtual characters may help portray the unique characteristics of those virtual characters. For example, the idle animations for a monster-like virtual character may include menacing actions like showing his teeth or growling.

In a given period of time (or timeline), multiple animations may affect one or more bones of a virtual character's skeleton. This technique is sometimes called layering. For example, virtual character A may be animated by simultaneously applying a running animation clip and a laughing animation clip to the virtual character. The running animation may control all of the bones of virtual character A, while the laughing animation may only control a subset of bones, such as those in the face. By layering these two animation clips, virtual character A appears to be laughing while running. Different weights may be applied to the various animation clips that are layered on a given virtual character's skeleton. The weights define the relative impact of the layered animation clips. For example, the laughing animation clip may be heavily weighted relative to the running animation clip with respect to the virtual character's facial bones, thus allowing the laughing animation to assert more control over the facial bones when the two animations are layered.

Aspects of the present invention relate to situations in which virtual characters are combinations of interchangeable parts from one or more different and independently animated virtual characters. Such combination characters will be referred to herein as composite virtual characters. An example composite virtual character might have the upper body of a reptilian virtual character and the lower body of a robot virtual character. Of course, this is merely an example, and the number of composite virtual characters is limited only by the number of virtual characters available for combination.

Animating composite virtual characters presents certain challenges. To illustrate some of these challenges, consider the case of a composite character that combines the upper body of virtual character A with the lower body of virtual character B. If virtual character A and virtual character B have distinct and conflicting animation clips denoting different behaviors and personalities, simply applying the predefined animation clips for virtual character A and virtual character B to their respective body parts may result in disjointed and unconvincing animations for the composite virtual character. For example, virtual character A's personality may be portrayed as rigid and formal, thus his idle animation clip may be stiff and relatively still. Virtual character B, on the other hand, might be portrayed as excitable and nervous, and thus his idle animation clip may include fidgeting and twitching motions. By simply applying virtual character A's idle animation clip to the composite character's upper body and virtual character B's idle animation clip to the composite character's lower body, the resulting idle animation for the composite character would appear to portray contradictory personalities for the upper and lower bodies and would lack cohesiveness.

Another challenge of animating composite virtual characters is properly aligning and layering the animations between the various parts of the combined virtual characters, as Character A and Character B's animations are built for skeletons that have no notion of the final composite skeleton. The attack animation for virtual character A's upper body, for example, may not align properly with the attack animation for virtual character B's lower body. Traditionally, one solution to this problem has been to create a skeleton mapper that maps all bones from a particular animation to fit into the new skeleton rig of a composite character. This process, however, is labor intensive and requires an animator or some other designer to make decisions as to which bone animations will affect the respective bone(s) in the composite skeleton.

Another solution to the described challenges is to create animation clips for every conceivable combination of virtual characters from scratch. But this solution is also burdensome and impractical. Furthermore, anytime a new virtual character is introduced, animations for an entire new set of composite virtual characters using this new virtual character must be created.

BRIEF SUMMARY OF THE INVENTION

In accordance with aspects of the invention, a software program running on a gaming platform comprises a plurality of virtual characters, each comprising a plurality of interchangeable body parts. An animation clip may be defined for an interchangeable body part of a first virtual character. The animation clip may be defined for the first virtual character's interchangeable body party using a virtual skeleton that has the bones of the interchangeable body part and the bones of one or more generic body parts. The defined animation clip may control one or more of the bones of the interchangeable body part and one or more of the bones of the one or more generic body parts.

In accordance with aspects of the invention, the plurality of virtual characters comprises a second virtual character with interchangeable body parts. The defined animation clip for the first virtual character's interchangeable body part may be applied to the generic bones of the second virtual character.

In accordance with aspects of the invention, the software program running on the gaming platform may command display of a composite virtual character on a display device associated with the gaming platform, the composite virtual character comprising the first interchangeable body part from the first virtual character and a second interchangeable body part from the second virtual character. The software program may control animation of the second interchangeable body part from the second virtual character using the defined animation clip for the first interchangeable body part from the first virtual character.

According to aspects of the invention, the first virtual character may correspond to a first toy comprising a plurality of toy parts, and the second virtual character may correspond to a second toy comprising a plurality of toy parts. Toy parts from the first toy and second toy may be connected, combined or assembled together to form a toy assembly representing the composite virtual character. The toy assembly and/or individual toy parts may be configured to communicate with the gaming platform. The toy assembly may communicate with the gaming platform either directly or via a peripheral device. The software program running on the gaming platform may be used to identify the individual toy parts and determine the corresponding toy assembly and composite virtual character. The gaming platform then displays the composite virtual character in a virtual environment on the display device.

In some embodiments, a user of the gaming platform can interchange the first toy part and second toy part with additional toy parts from a plurality of virtual characters. The interchanging of toy parts causes a contemporaneous graphical display of the new toy assembly's corresponding composite virtual character. Accordingly, a user can affect the appearance and interaction between the composite virtual character and the virtual environment by modifying the physical toy parts and accessory parts.

In some embodiments, each toy part may be configured with an identification tag, such as an RFID tag with a numeric or alphanumeric code providing an identification of the toy part. Each toy part may communicate with the gaming platform, either directly, via a peripheral or via other toy parts or any combination thereof, to provide the gaming platform with the identification information in the tag. For example, in some embodiments, a peripheral is in communication with the gaming platform. The toy assembly comprising the plurality of toy parts may be placed on or in proximity of the peripheral. The toy part closest to the peripheral may include an antenna for communicating with the peripheral. The other toy parts comprising the toy assembly may communicate with the toy part closes to the peripheral either through wireless transmission or wired transmission.

In some embodiments, each toy part includes a rewritable memory. Information relating to the toy part may be stored in the memory. For example, information pertaining to the ownership of the toy part, the use of the toy part in connection with one or more gaming platforms or attributes of the toy part within the virtual environment may be stored in the memory. For example, as the user uses the toy part in connection with playing a video game on a gaming platform, data relating to accomplishments and challenges overcome by the user in the video game may be stored in the memory of the toy part. As another example, the user may be given opportunities to modify certain virtual attributes associated with one or more toy parts as he or she plays the video game. The stored information may be used in subsequent gaming sessions and across various gaming platforms so that the virtual attributes of each toy part and each accessory part persist.

In some embodiments, toy parts may comprise accessories. For example, a toy part may be a weapon, clothing item, hat, shield, armor, shoes or other accessories that may be connected, attached, interlocked with or otherwise combined with a toy assembly having one or more parts.

Some aspects of the invention provide a computer-implemented method for animating a composite virtual character, comprising: displaying a composite virtual character comprising a first part from a first virtual character and a second part from a second virtual character, and animating the composite virtual character, wherein animating the composite virtual character comprises substantially simultaneously animating first portions of the first part from the first virtual character and second portions of the second part from the second virtual character using an animation defined for the first virtual character and animating at least first portions of the second part from the second virtual character using an animation defined for the second virtual character.

Some aspects of the invention provide a video game system, comprising: a game device having an input device and a processor for executing program code for providing for play of a videogame; a plurality of physical parts from a plurality of toy figures that are physically combinable to form a composite toy assembly, the plurality of physical parts including memory providing a unique identification of each physical part and configured to communicate said unique identification; said program code having instructions for providing a graphical display of a composite virtual character representing said composite toy assembly, said composite virtual character comprised of virtual parts representing physical parts combined to form the composite toy assembly; said program code further having instructions for providing a virtual environment for said composite virtual character; wherein said movement and actions of said composite virtual character are controlled, in response to inputs received by said input device, by at least one animation defined for at least one of said virtual parts and at least one other animation defined for at least one other one of said virtual parts, with the at least one animation defined for at least one of said virtual parts completely controlling movement and actions of some elements of said composite virtual character and partially controlling movement and actions of other elements of said composite virtual character.

Some aspects of the invention provide a computer implemented method including animating a character comprised of different portions derived from other characters, some of the different portions including body elements of a first type and some of the different portions including body elements of a second type, the method comprising: applying, for each of the different portions including body elements of the first type, an animation routine defined for the different portion for the other character from which the different portion was derived for the body elements of the first type; and applying in a weighted manner, for each of the different portions including body elements of the second type, the animation routines defined for the different portion for the other characters for the body elements of the second type.

Some aspects of the invention provide a method of animating a character defined by a combination of elements of other characters, some of whose elements are considered generic to a plurality of characters and some of whose elements are considered specific to each of the other characters, with no animation routines being predefined for the character but with animation routines being predefined for the other characters, the method comprising: determining characters serving as a source of elements of the character; receiving a command for display of a particular animation routine for the character; generating the particular animation routine for the character by: applying corresponding character specific predefined animation routines to elements of the character that are considered specific to the characters serving as the source of elements of the character, and applying weighted sums of the corresponding character specific predefined animation routines to elements of the character that are considered generic to the characters serving as the source of elements of the character.

These and other aspects of the invention are more fully comprehended upon review of this disclosure.

DETAILED DESCRIPTION

Figure 1:
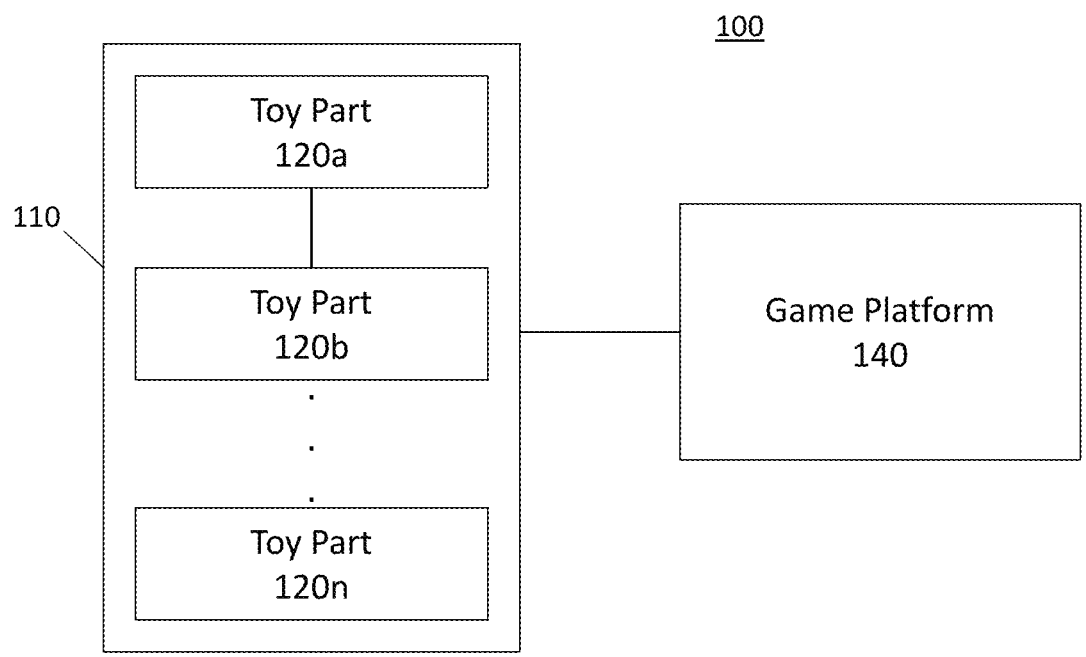
FIG. 1 is a block diagram illustrating an example of a video game system in accordance with aspects of the present invention.

FIG. 1 is a block diagram illustrating an example of a video game system in accordance with aspects of the present invention. Referring to FIG. 1, the video game system 100 includes game system 140 and a toy assembly comprised of a plurality of component toy parts 120*a-n*. The toy assembly may consist of toy parts associated with a single character, or the toy assembly may consist of toy parts from a plurality of characters (referred to as a "composite toy assembly"). The toy parts may be physically combined, coupled, connected or otherwise adjoined to create a toy assembly. In some embodiments, the toy parts may be coupled in an interlocked fashion to create a toy assembly, for example via a physical locking mechanism, electromagnetic or other locking mechanism. In various embodiments the toy parts 120*a-n* may be connected by a force, for example a physical or electromagnetic force, such as by way of interlocking physical components, frictional fittings, or magnetic couplings, or by way of other known connections.

Each of the toy parts 120*a-n* may include a rewriteable data storage component, such as RAM or rewritable RFID tag. The memory or tag may store data reflecting the identification of the toy part. In addition, in various embodiments the memory may store other data corresponding to a portion of a character or other object within the game executed on game platform 140 which the toy part represents. The other data may include data such as strength, experience, wealth, health, ownership, achievements, activity level, use or other game play data of the portion of the character or other object. For example, if the toy part corresponds to an arm of a character in game play, the memory of the toy part may store information regarding strength or health of the arm. In some embodiments the memory may store other data, for example the other data mentioned above, with respect to a character or object as a whole, and in some embodiments all toy parts which in combination correspond to the character or object may store some or all of such information. The memory may be rewritable so that the stored attributes and characteristics of the toy parts may be updated during each game session and utilized in subsequent game sessions.

The game platform 140 is a system for executing game software and in various embodiments may comprise a device such as a personal computer, laptop, tablet, game console, portable game platform, or mobile device, or in some embodiments one or more devices in communication with one or more servers. In some embodiments the game platform 140 comprises a processor for executing program instructions providing for game play and associated circuitry, a video game controller 180, a display device 170, and in some embodiments a peripheral device (not shown in FIG. 1) for communicating with a toy or toy parts.

The game platform 140 may connect or be coupled to a display device or have a display device integrated with or within the game platform for displaying graphics associated with the game operating on the game platform 140. The instructions providing for game play may be stored on removable media, for example, an optical disk or cartridge, or otherwise stored in memory of the game platform. Accordingly, the game platform, for example a game console, may include an optical drive, for example, a DVD-ROM drive, for reading the instructions for game play. In other embodiments, the instructions providing for game play may be stored in a remote server that are accessed by a game platform, for example a computer, PC, game console, or mobile device. In yet other embodiments, the instructions providing for game play may be stored locally in the game device memory.

The toy parts 120a-n may communicate with game platform 140 directly or via a peripheral device. In some embodiments a first toy part 120a may communicate information to second toy part 120b and the second toy part 120b may communicate information relating to both first toy part 120a and second toy part 120b to game platform 140, either directly or via peripheral 130 as depicted in FIG. 1. Similarly, in some embodiments multiple toy parts may communicate information to the second toy part, either directly or through one or more intervening toy parts, with the second toy part communicating information to the game platform, either directly or through the peripheral. In alternative embodiments, the toy parts 120a-n communicate with game platform 140 independently.

Figure 2A:
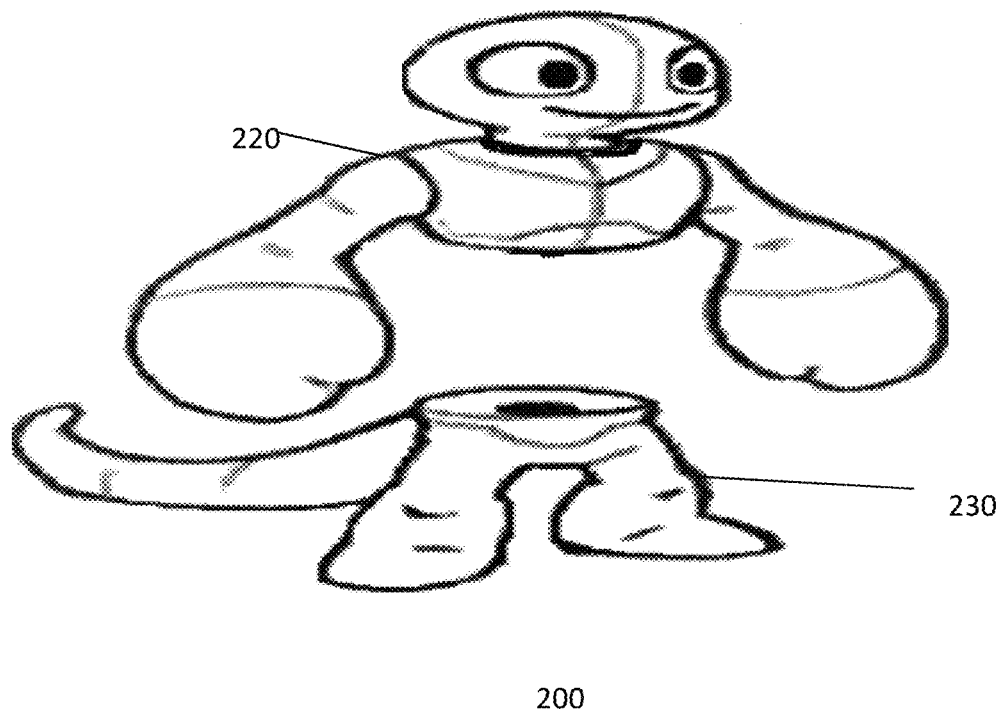
FIG. 2A depicts an example of a toy assembly for use in conducting a video game in accordance with aspects of the present invention.
Figure 2B:
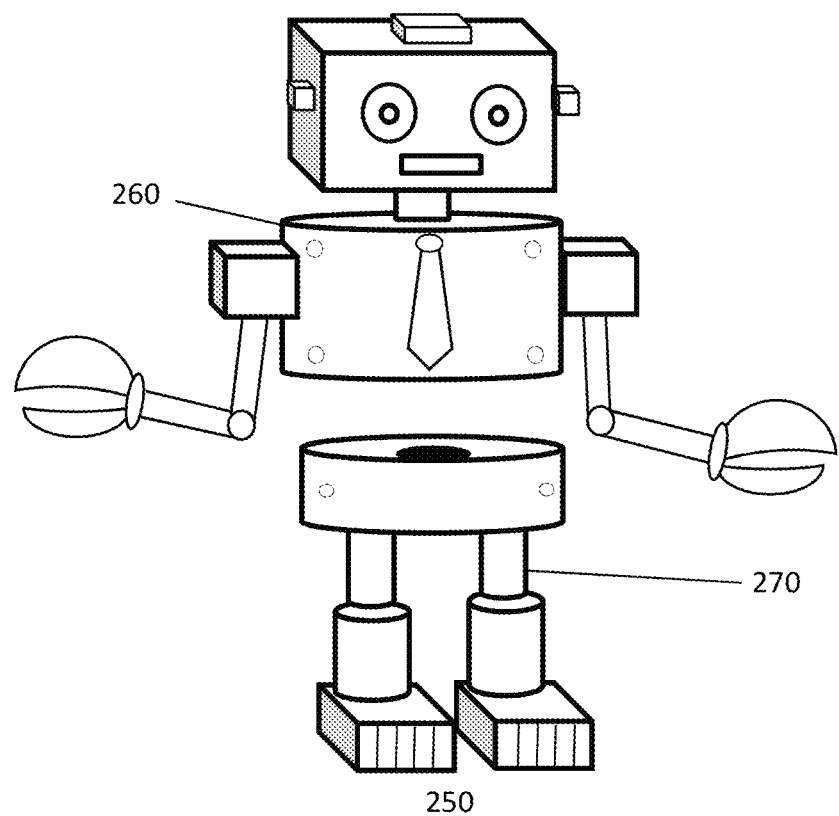
FIG. 2B depicts an example of a toy assembly for use in conducting a video game in accordance with aspects of the present invention.

FIGS. 2A and 2B depict examples of toy assemblies for use in conducting a video game in accordance with aspects of the present invention. The toy assemblies depicted in FIGS. 2A and 2B each consist of toy parts for a single character. FIG. 2A depicts a toy assembly 200 configured as a reptilian toy figure. FIG. 2B depicts a toy assembly 250 configured as a robot toy figure. Of course, toy assemblies 200 and 250 could instead be configured as an action figure, robot figure, a vehicle, humanoid figure, monster figure, or other toy figure. Toy assembly 200 and 250 of FIGS. 2A and 2B each include two toy parts: a torso 220, 260 and legs 230, 270. Although two toy parts are shown, the number and type of toy parts are exemplary only and should not be considered as limiting. For example, the head and/or arms included in torso 220, 260 and the tail 240 included in the legs 230 may also be provided as separate toy parts.

Figure 2C:
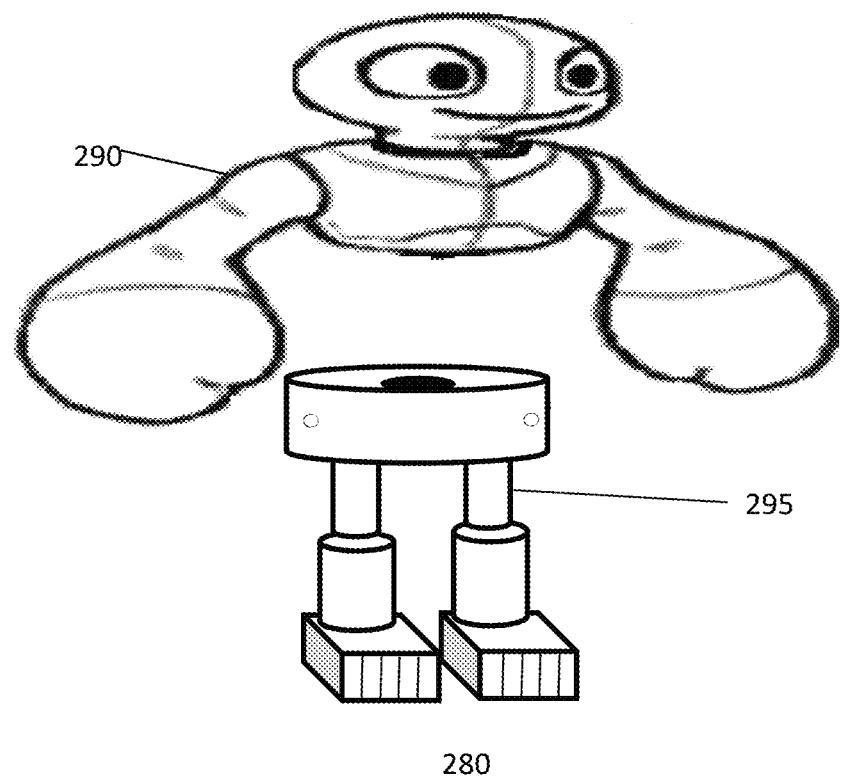
FIG. 2C depicts an example of a composite toy assembly for use in conducting a video game in accordance with aspects of the present invention.

FIG. 2C depicts an example of a composite toy assembly for use in conducting a video game in accordance with aspects of the present invention. As discussed, composite toy assemblies consists of toy parts from a plurality of characters. Composite toy assembly 280 includes two toy parts: a torso 290 and legs 295. In this particular example, composite toy assembly 280 combines the torso of toy assembly 200 and legs of toy assembly 250.

Each of the different toy parts may be part of a class of toy parts for use in various toy assemblies. That is, a toy assembly may be configured according to preference using a plurality of interchangeable torso parts and a plurality of interchangeable leg parts. For example, either torso 220 or torso 260 may be replaced with a different torso from a different character to create a new composite character. In some embodiments, the toy parts comprise accessories or other objects to be used by the toy character. For example, a toy part may comprise a weapon, shield, tool, clothing, accoutrements or other item.

The toy parts may be physically combined, coupled, connected or otherwise adjoined to create a toy assembly. In some embodiments, the toy parts may be coupled in an interlocked fashion to create a toy assembly, for example via a physical locking mechanism, electromagnetic mechanism or other locking mechanism. In some embodiments, the connectors for each of the toy parts may be configured so as to restrict connection of toy parts, for example, to restrict use of a torso toy part to replace a legs toy part.

Each toy part includes machine-readable information, for example, memory, a radio frequency identification (RFID) tag or a barcode. The machine-readable information may be sensed, read, and/or in some embodiments written, directly by a game console, or in some embodiments indirectly by way of sending data and commands to the toy to write the data to memory of the toy parts. The machine-readable information may include a numeric identifier. In some embodiments, the communication with the toy may be conducted via a peripheral such as a peripheral or other reader. The machine-readable information allows the reader, or the processor of the game console, to distinguish one toy part from other toy parts, and the machine-readable information may therefore be considered to include a toy part identifier, and in some embodiments, each particular toy part may have its own distinct identifier. In addition, in some embodiments the machine readable information includes additional information related to player achievement in a video game when the part is in use.

Figure 3:
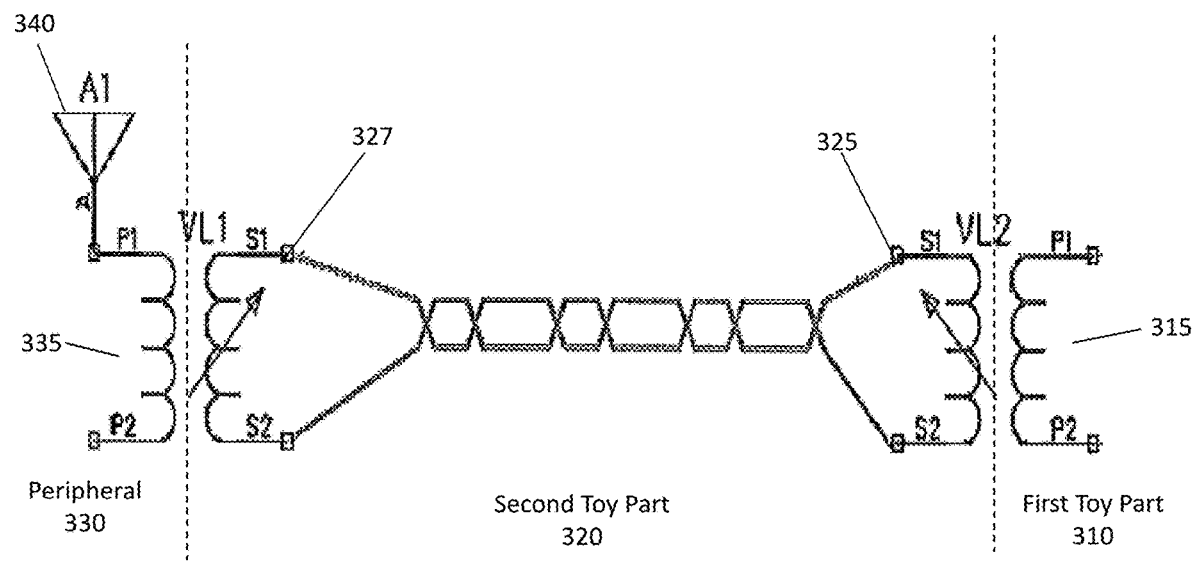
FIG. 3 is a diagram depicting electronic components of toy parts in accordance with aspects of the present invention.

FIG. 3 is a diagram depicting an embodiment of the electronic components of toy parts in connection with the present invention. First toy part 310 comprises an RFID tag 315. RFID tag 315 utilizes a wireless system that uses radio-frequency electromagnetic fields to transfer data from (and in various embodiments to) the tag coupled, for example for purposes of automatic identification and tracking. Some tags require no battery and are powered by the electromagnetic fields used to read them. Others use a local power source and emit radio waves (electromagnetic radiation at radio frequencies).

RFID tag 315 contains numerical information for identifying first toy part 310. First toy part 310 may be physically coupled to a second toy part 320. Second toy part 320 includes a circuit 325, for example an inductor circuit, for receiving the RFID electromagnetic field from RFID tag 315 in first toy part 310. When first toy part 310 and second toy part 320 are sufficiently proximate to one another or in contact with one another, the numerical information in RFID tag 315 is transmitted to the inductor circuit 325. Inductor circuit 325 is electronically coupled to an interface 327, such as a near field transmitter, in second toy part 320. Interface 327 communicates with peripheral 330. The near field transmitter may also be an RFID tag, in some embodiments.

The peripheral 330 includes a radio-frequency interface 335 to communicate with toys and/or toy parts. In many embodiments, the radio-frequency interface is an RFID interface. In other embodiments, the peripheral may include a different interface for communicating with toys, such as an optical interface or a wired interface. Further in some embodiments the toy may include a wired connection to the peripheral device, or in some embodiments, a wired connection to the game platform, possibly dispensing with the peripheral device. Similarly, in some embodiments the toy may include wireless communication capabilities of the type commonly used with computers, for example Bluetooth, NFC or Wi-Fi capabilities. The peripheral 330 may then transmit the information received from RFID tag 315 associated with first toy part 310 and information received from an RFID tag in second toy part 320 to a game platform utilizing antenna 340.

Figure 4:
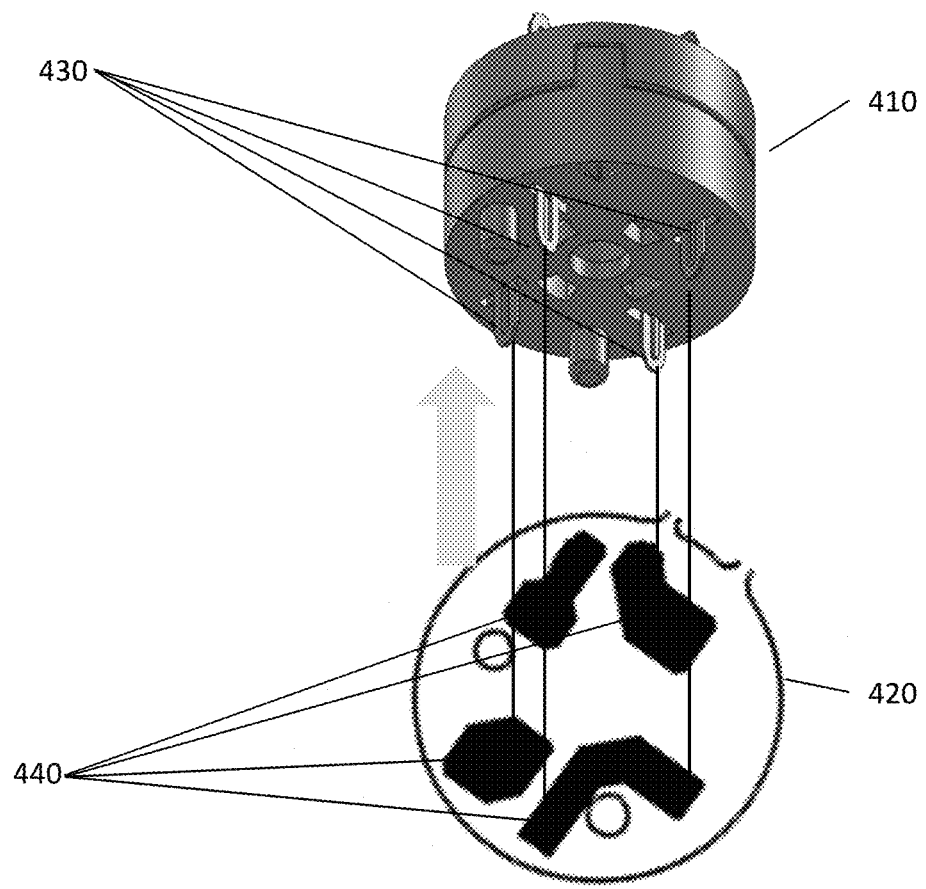
FIG. 4 is a diagram depicting electronic components of toy parts in accordance with aspects of the present invention.

FIG. 4 is a diagram depicting an embodiment of the electronic components of toy parts in connection with the present invention. First toy part 410 comprises an RFID tag or a storage device. The RFID tag contains numerical information for identifying first toy part 410. First toy part 410 may be physically coupled to second toy part 420. First toy part 410 includes one or more plugs or connectors 430 that fit into a receptacle(s) 440 on second toy part 420. In some embodiments, the connector(s) 430 and receptacle(s) 440 may be used to provide an electrical connection between the two toy parts to enable the transmission of data between the connected toy parts. In some embodiments, the first toy part 410 and second toy part 420 may utilize magnetic connectors to maintain contact between the toy parts. For example, the first toy part 410 and second toy part 420 may each have a magnetic element. When the connector(s) 430 and receptacle(s) 440 are brought into proximity, the magnetic attraction between the magnet and its complement, whether another magnet or a ferromagnetic material, maintains the toy parts in contact with one another. In embodiments in which the connectors are used to provide electrical connection between the toy parts, the magnetic elements may maintain the contacts in an electrically conductive relationship. When the connectors associated with first toy part 410 are in contact with receptacle associated with second toy part 420, data from a memory device or numerical information in an RFID tag in first toy part 410 may be transmitted to second toy part 420 for subsequent transmission to a game platform, and/or in some embodiments vice versa. In some embodiments strength of transmitters for communication between the two toy parts are selected to be sufficiently low to require contact between the toy parts to allow for successful communication between the toy parts. Such a configuration may be beneficial, for example, to reduce or eliminate interference with other communications to the game platform or a peripheral, or receipt of extraneous communications by same.

Figure 5:
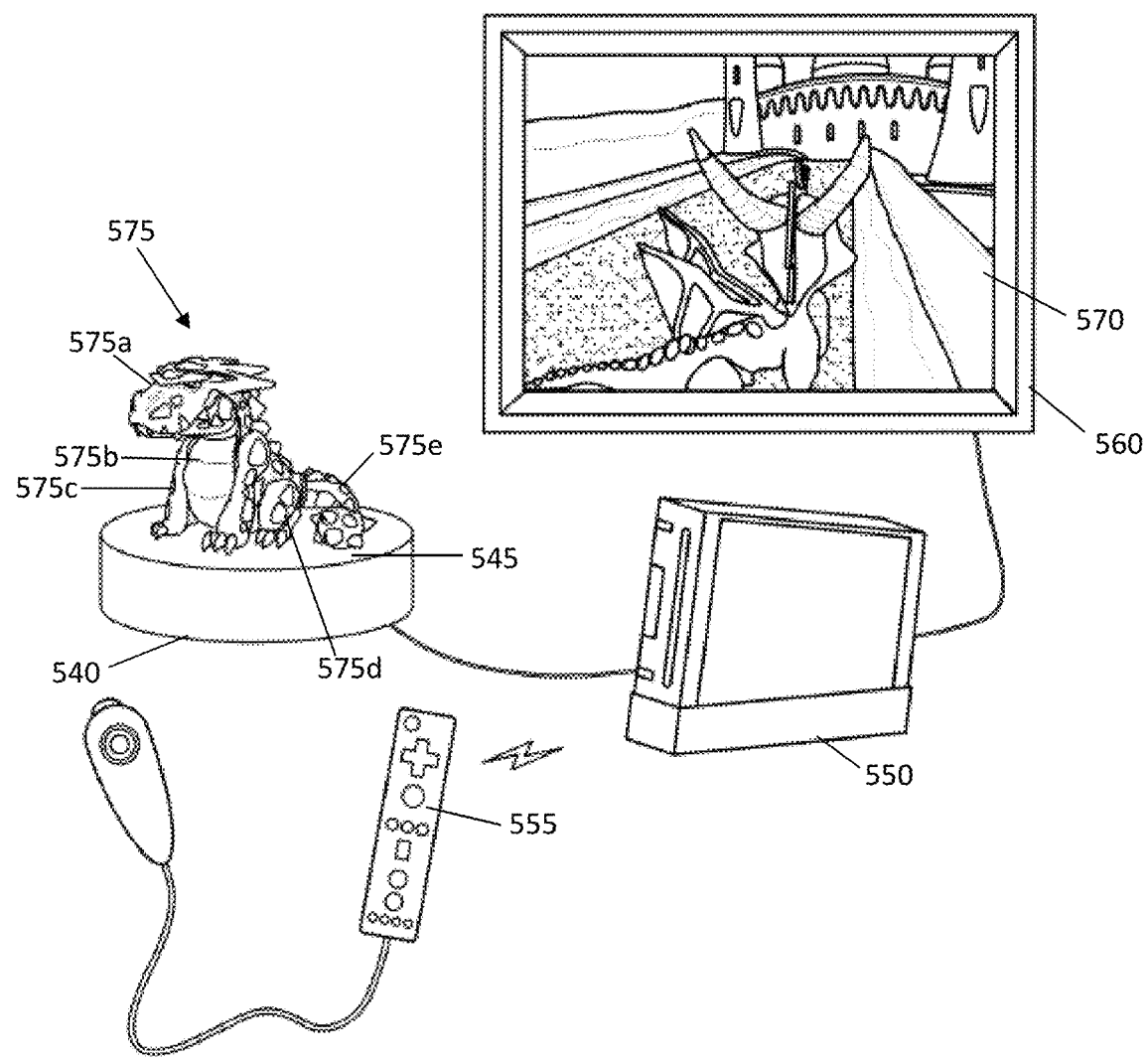
FIG. 5 illustrates an example of a video game system in accordance with aspects of the invention.

FIG. 5 illustrates an example of a video game system in accordance with aspects of the invention. The video game system includes a game console 550 with a processor for executing program instructions providing for game play and associated circuitry, user input devices such as a game controller 555, a display device 560 for displaying game action, a peripheral device 540, and a toy assembly 575. Toy assembly 575 is comprised of a plurality of interconnected toy parts, including head part 575a, torso part 575b, arm parts 575c, leg parts 575d, and tail part 575e, each of which includes memory storing identification information.

The peripheral device 540 may provide the capability to read and write information to the toy assembly 575 and/or its component toy parts. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad. In other embodiments, the instructions providing for game play may be stored in a remote server that are accessed by a computer or mobile device. In yet other embodiments, the instructions providing for game play may be stored locally in the game device memory.

The display device is generally coupled to the game platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 570 of the display device displays video images of game play, generally as commanded by the processor or other associated circuitry of the game platform. In the embodiment of FIG. 5, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 5, has a substantially flat upper surface for placement of toys thereon. The game player generally places game toys, for example, toy assembly 575 in the form and representative of a dragon as shown in FIG. 5, on the flat surface of the peripheral device during game play. The toy assembly 575 is generally in the form of and representative of a game item such as a game character or other game item. In several embodiments, the toy assembly is associated with a game character during game play.

Peripheral 540 includes a surface 545 where toy assembly 575 may be placed. Peripheral 540 may be coupled with a game platform 550 either through a wired or wireless connection. Game platform 550 may be any form of game platform, such as game console (e.g., Xbox, Playstation, Wii, NDS), computer, mobile device or other device for executing game software either locally or from a server. The game platform 550 executes software for a video game. The game platform 550 may be connected to a display 560. In other embodiments, a display may be incorporated into the game platform 550, such as in mobile devices or portable computer devices.

The display 560 provides for the visual display of graphics associated with the game 570. A software program running on the game platform 550 allows the game platform 550 to identify the individual toy parts and determine the corresponding toy assembly 575. The game platform 550 then displays graphically a virtual character representing the toy assembly 575 comprised of the toy parts assembled or combined together. In some embodiments, the toy assembly 575 may be a composite toy assembly comprised of toy parts from different toy figures. In such embodiments, the corresponding virtual character representing the toy assembly 757 would be a composite virtual character. The virtual character or composite virtual character may be displayed in a virtual environment on a display device 560 associated with the game platform 550. The toy parts interact dynamically with the software program so that the virtual character representing the toy on the display device corresponds to the physical appearance of the toy assembly. The user can interchange toy parts with a contemporaneous graphical display of the corresponding virtual character. Accordingly, a user can affect in real time the appearance and interaction between the virtual character and the virtual environment by modifying the physical toy parts and accessory parts.

A user may control the movements of the virtual character (or composite virtual character) in the game using a controller 555. The controller 555 may be a separate from the game platform 550 or integrated therein.

Each toy part 575*a-e* may include a memory or tag for identifying the part. For example, in some embodiments, each part 575*a-e* includes an RFID tag with a numerical code to uniquely identify the part. The information pertaining to the identification of each part 575*a-e* may be communicated to the game platform 550 through the peripheral 540. In alternative embodiments, the toy parts 575*a-e* may communicate with the game platform 550 directly. In still other embodiments, the toy parts 575*a-e* may communicate with each other and provide combined information to the game platform 550 either directly or through a peripheral 540. In other embodiments, each toy part includes a rewritable memory. Information relating to the toy part may be stored in the memory. For example, information pertaining to the ownership of the toy part, the use of the toy part in connection with one or more game platforms, achievements accomplished in the game while using the toy part, or attributes of the toy part within the virtual environment may be stored and updated in the memory. For example, as the user uses the toy part in connection with playing a video game on a game platform, data relating to accomplishments and challenges overcome by the user in the video game may be stored in the memory of the toy part. As another example, the user may be given opportunities to modify certain virtual attributes associated with one or more toy parts as he or she plays the video game. The stored information may be used in subsequent game sessions and across various game platforms so that the virtual attributes of each toy part and each accessory part persist.

Figure 6:
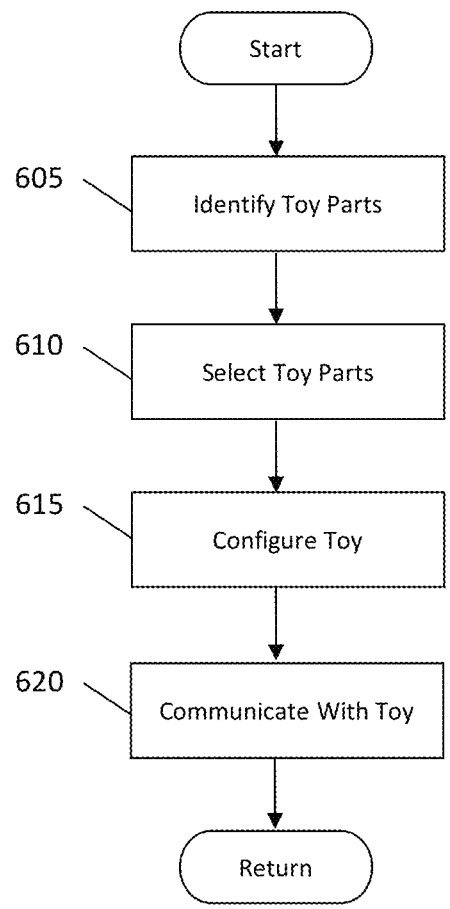
FIG. 6 is a flow diagram of a process for selecting and communicating with toy parts in accordance with aspects of the present invention.

FIG. 6 is a flow diagram of a process for selecting and communicating with toy parts in accordance with aspects of the present invention. In some embodiments the process is performed by a game platform, for example as discussed with respect to FIG. 1. At block 605, the process identifies toy parts. In some embodiments, the process may identify toy parts within a defined region. For example, the process may determine what toy parts are on the surface of a video game peripheral as shown in FIG. 5. In various embodiments, the toy parts may be identified by RFID, barcodes, or optical recognition. In one embodiment, identification of toy parts includes a video game peripheral reading identifiers of the toys and supplying the identifiers to a video game console.

In block 610, the process selects a toy part for communication. In some embodiments, the process may select multiple toy parts of a toy assembly for communication. The process may select the toy part by transmitting a selection command having an identifier matching the identifier of the toy part. In many embodiments, the process expects to receive an acknowledgment of the selection from the toy part. When an acknowledgment is not received, the process may retransmit the selection command or may signal a video game associated with the process that the selected toy is not available.

In block 615, the process configures a virtual character. The process may configure the virtual character based on the identified parts. In some embodiments, the identified parts may be from different characters. In some embodiments, the process may configure the virtual character based on configuration information indicating how the identified toy parts are connected. For example, the configuration information may include the identification of coupled toy parts and information regarding the connector and receptacle through which the toy parts are coupled.

In block 620, the process communicates with the toy parts. For example, the process may read from a particular memory location of the toy parts or may write to a particular memory location of the toy parts. In various embodiments the process communicates with the toy parts during game, for example communicates relating to presence of a corresponding virtual character in the game or changes to the states of the virtual character. In many embodiments, the process expects to receive an acknowledgment or response from the toy parts, and when not received, the process may retransmit the command or may signal the video game associated with the process that the selected toy part is not available. The process thereafter returns.

Figure 7:
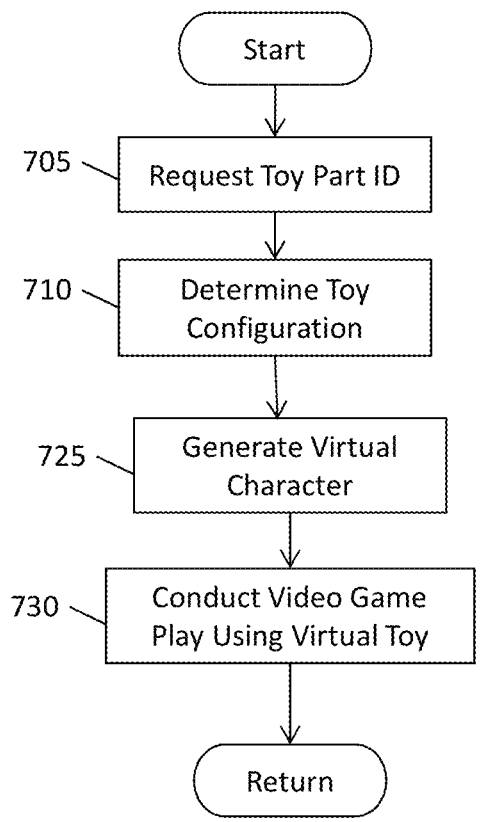
FIG. 7 is a flow diagram of a process for conducting video game play in accordance with aspects of the present invention.

FIG. 7 is a flow diagram of a process for conducting video game play in accordance with aspects of the present invention. In some embodiments the process is performed by a game platform, for example as discussed with respect to FIG. 1. In block 705, the process requests toy part identification. In some embodiments, the process may identify toy parts within a defined region. For example, the process may determine what toy parts are on the surface of a video game peripheral as shown in FIG. 5. In various embodiments, the toy parts may be identified by RFID, barcodes, or optical recognition. In one embodiment, identification of toy parts includes a video game peripheral reading identifiers of the toys and supplying the identifiers to a video game console.

In block 710, the process determines a toy configuration based on the toy part identifications. In some embodiments, the process may use a lookup table or other database to determine a configuration based on the toy parts identified. In some embodiments, the process may communicate with the toy parts to receive connection information indicating the other parts a particular toy part is connected to and an indication of which connector of the toy part is used to make such connection.

At block 725, the process may generate a virtual character or composite virtual character corresponding to a physical toy assembly including each of the identified toy parts.

In block 730, the process conducts video game play using the virtual character or composite virtual character. As the virtual toy is used to progress through the video game, data relating to accomplishments and challenges overcome by the user in the video game may be stored in the memory of the toy parts of the toy assembly.

Thereafter the process returns.

Figure 8:
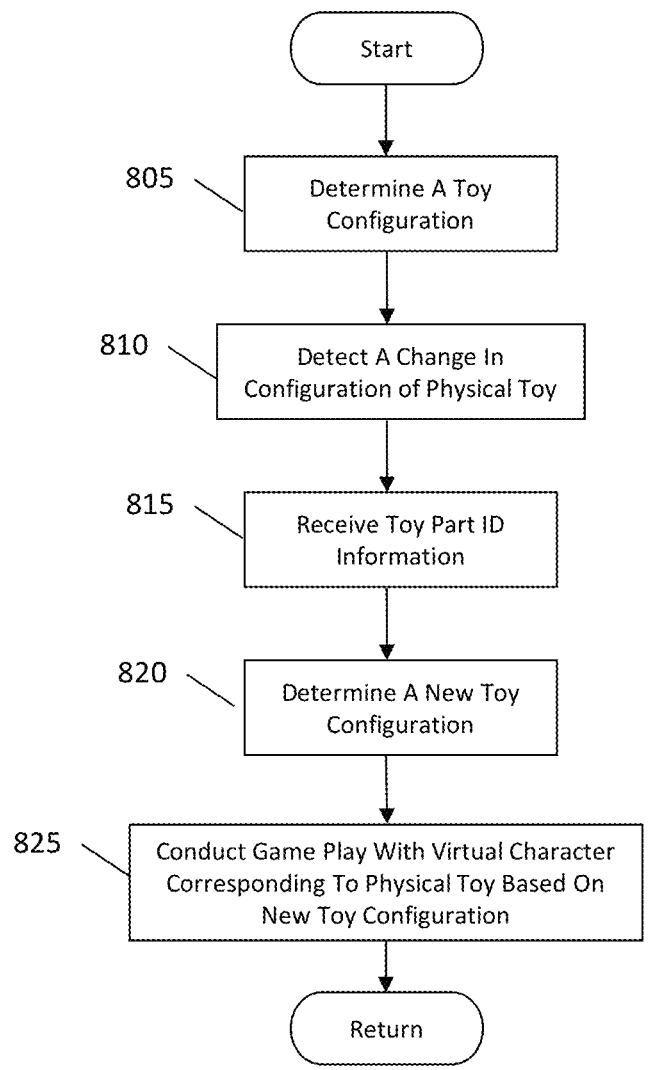
FIG. 8 is a flow diagram of a process for conducting video game play in accordance with aspects of the present invention.

FIG. 8 is a flow diagram of a process for conducting video game play in accordance with aspects of the present invention. In some embodiments the process is performed by a game platform, for example as discussed with respect to FIG. 1. In block 805, the process determines a toy configuration based on toy parts identified. In some embodiments, the process may use a lookup table or other database to determine a configuration based on the toy parts identified. In some embodiments, the process may communicate with the toy parts to receive connection information indicating the other parts a particular toy part is connected to and an indication of which connector of the toy part is used to make such connection.

In block 810, the process detects a change in the configuration of the physical toy. In some embodiments, a change may be detected when an identified toy part is removed from a defined area, for example, a surface of peripheral 550 shown in FIG. 5.

In block 815, the process may receive toy part identification information. In some embodiments, the process may identify toy parts located in a predefined region. In some embodiments, the process may determine the toy part identification only for the new toy parts added.

In block 820, the process may determine a new toy configuration. In some embodiments, the process may use a lookup table or other database to determine a configuration based on the toy parts identified including the new toy part(s). In some embodiments, the process may communicate with the toy parts to receive connection information indicating the other parts a particular toy part is connected to and an indication of which connector of the toy part is used to make such connection.

In block 825, the process may conduct game play with a virtual character or composite virtual character corresponding to the new toy assembly. Thereafter, the process returns.

Figure 9:
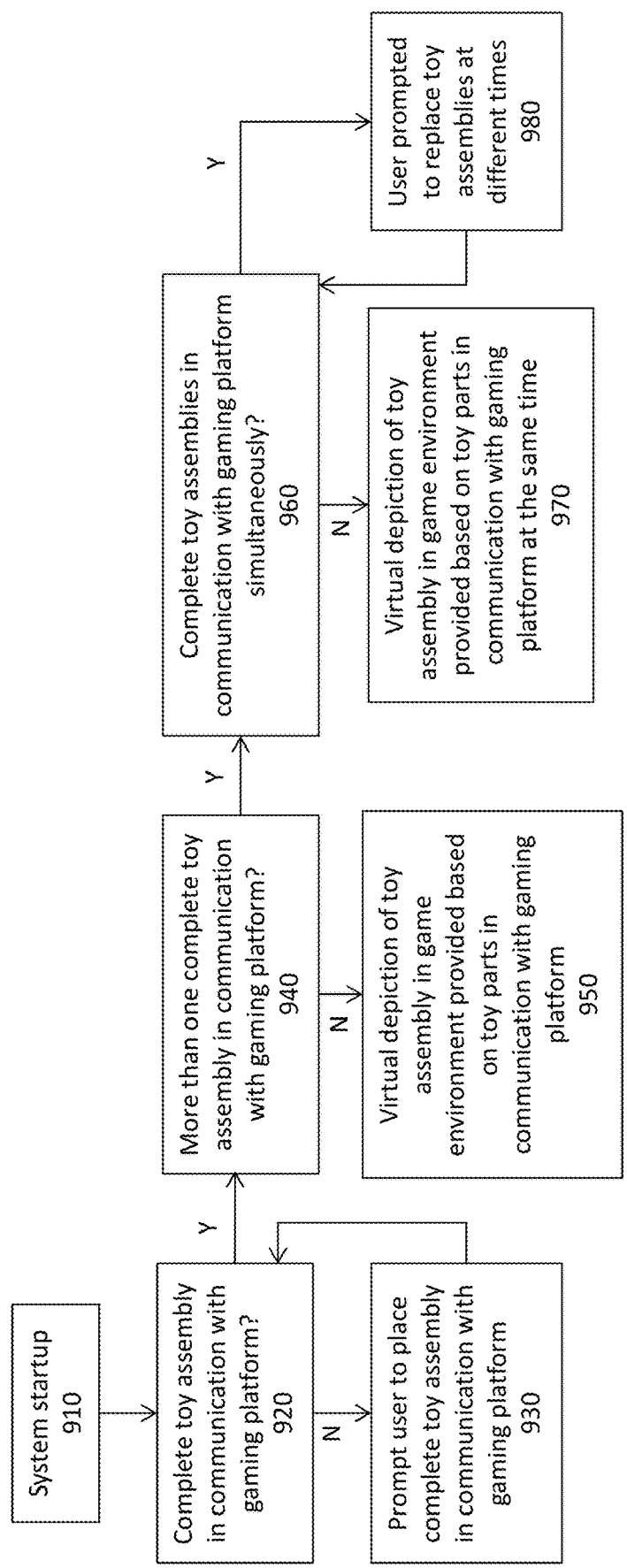
FIG. 9 depicts a flow diagram of a process for identification of one or more toy assemblies by the game platform.

FIG. 9 depicts a block diagram of a process for identification of one or more toy assemblies by the game platform. In the present embodiment, the toy assemblies comprise two parts—a top part and a bottom part. When a top toy part is properly connected to the bottom toy part a complete toy assembly is assembled. In some embodiments, the system will not recognize toy parts that do not comprise a complete toy assembly. In block 910, the system starts up. At this time, the system is capable of communicating with the toy parts and receive identification information for toy parts.

In block 920, the system determines if a complete toy assembly is in communication with the game platform. If no complete toy assembly is detected by the system, the system prompts the user to place a complete toy assembly in communication with the game platform at block 930.

In block 940, the system determines if more than one toy assembly is in communication with the game platform. If only a single complete toy assembly is in communication with the game platform, the system can depict the toy assembly in the game environment for game play in block 950. If multiple complete toy assemblies come into communication with the game platform asynchronously, the system can determine the respective toy assemblies based on the timing of the communication of the toy parts with the system in block 970. For example, if first complete toy assembly comprising toy part A and toy part B and a second toy assembly comprising toy part X and toy part Y are in communication with the game system, the game system can determine that the first toy assembly comprises toy part A and toy part B (as opposed to some other combination with toy part X or toy part Y) because toy part A and toy part B are in communication with the system at or about the same time, and toy part X and toy part Y come into communication with the system at a different time. If however the first toy assembly and second toy assembly come into communication with the system at or about the same time in block 960, the system may have difficulty identifying which toy parts constitute the respective toy assemblies, since four or more toy parts have been identified by the game platform at or about the same time. In this situation, the user may be prompted to replace the toy assemblies in communication with the system at different times in block 980.

After recognition and identification by the system, toy parts may be associated with a player based on the toy part identification number. Therefore, the game can easily recognize two players using the same type of parts and still update each toy's data based on player association.

In other embodiments, more sophisticated RFID chips may be utilized to provide communication between the various toy parts and the game platform. For example, the first toy part may comprise an RFID chip that provides an indication of whether a second toy part is in contact with the first toy part.

As discussed above, animating a composite virtual character as described herein presents certain challenges. In accordance with aspects of the invention, a process for defining animations for virtual characters that may be smoothly and cohesively applied to composite virtual characters is described.

Figure 10:
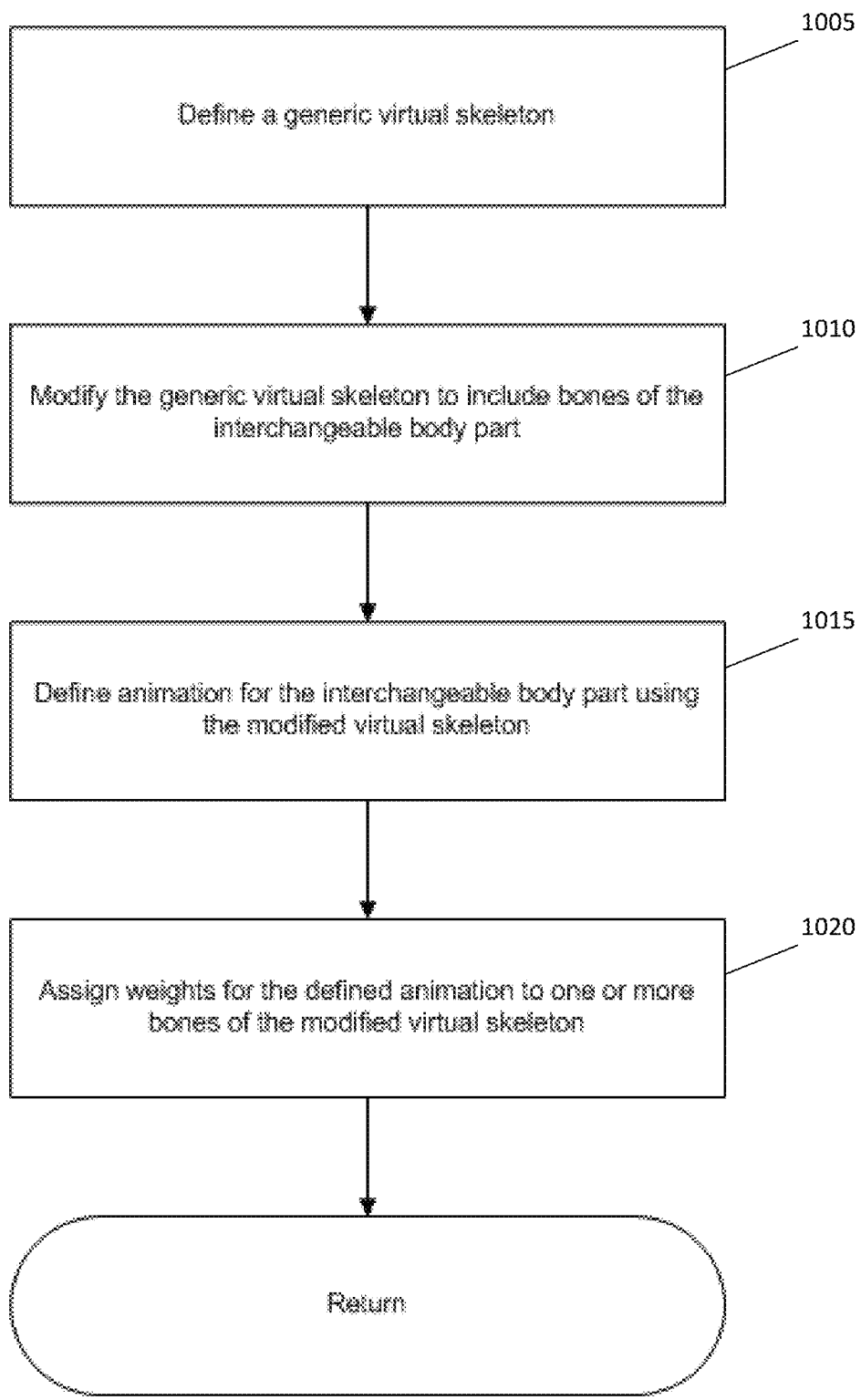
FIG. 10 depicts a flow diagram of a process defining an animation for a virtual character's interchangeable body part in accordance with the present invention.

FIG. 10 is a flow diagram of a process for defining an animation for a virtual character's interchangeable body part in accordance with the present invention. In some embodiments the process is performed by a computer, and in some embodiments the process is performed by a network of computers. As will be discussed in more detail below, the process begins with a generic virtual skeleton and then modifies the generic virtual skeleton to reflect the specific features of the interchangeable body part. The process then defines the animation for the interchangeable body part using the modified virtual skeleton that has the bones of the interchangeable body part and generic bones corresponding to the remaining generic body parts.

Figure 12:
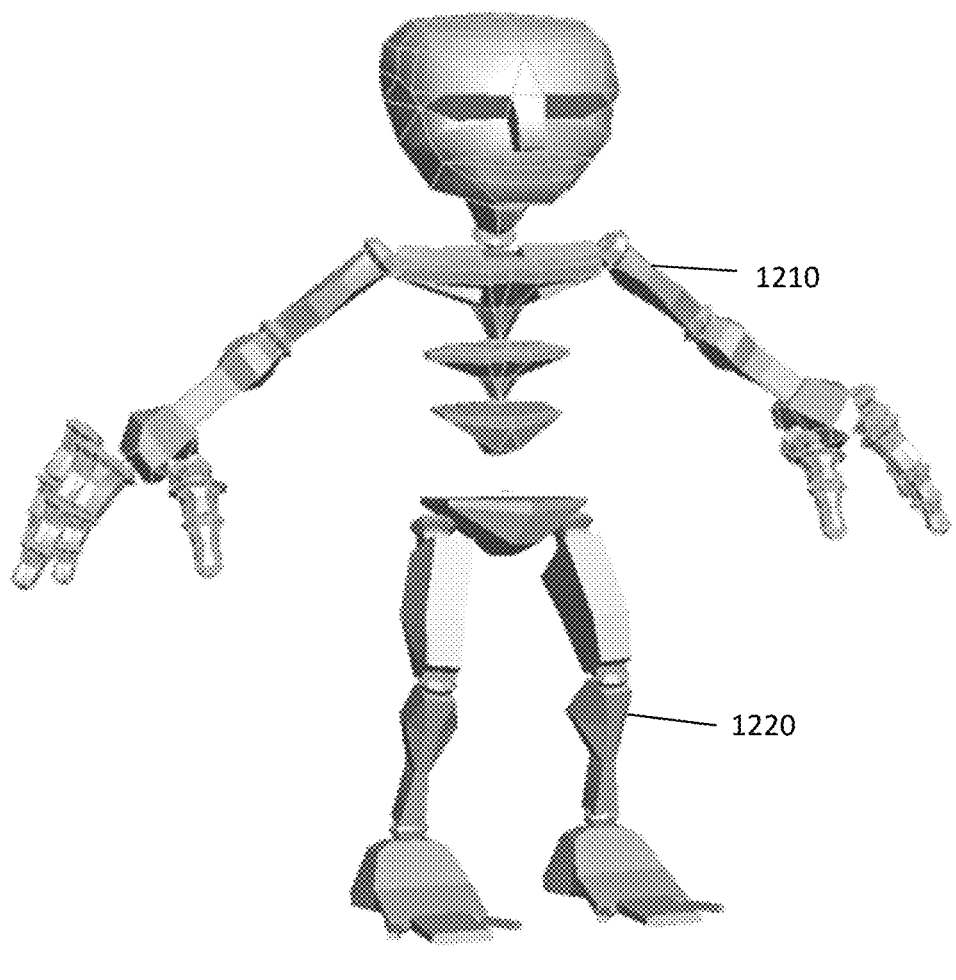
FIG. 12 depicts an exemplary generic virtual skeleton in accordance with the present invention.

In block 1005, the process begins by defining a generic virtual skeleton corresponding to a generic virtual character. FIG. 12 depicts an exemplary generic virtual skeleton in accordance with the present invention. The generic virtual skeleton 1200 of FIG. 12 is in the form of a humanoid with a generic torso body part 1210 and a generic legs body part 1220, each having a plurality of bones and/or joints. However, the shape, form, number, and arrangement of the bones and/or joints in the virtual skeleton are merely exemplary, and essentially any form of a generic virtual skeleton may be adopted. The generic virtual skeleton may be the basis for a plurality of virtual characters. Thus, as will be appreciated more fully below, the virtual skeletons of a plurality of virtual characters may be derived from the generic virtual skeleton and share one or more of the generic virtual skeleton's bones.

Figure 13:
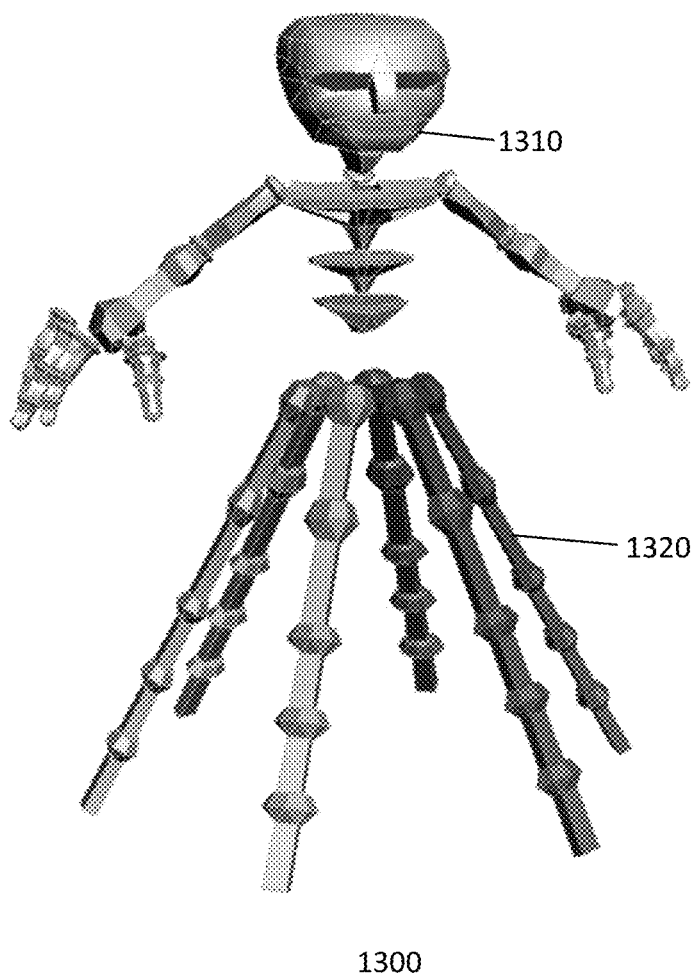
FIG. 13 depicts an exemplary modified virtual skeleton in accordance with the present invention.

Returning to FIG. 10, in block 1010, the process modifies the generic virtual skeleton to reflect the specific features and form of the virtual character's interchangeable body part. In some embodiments, the modification may be made based on inputs provided by an animator or game designer. In some embodiments, generic bones may be removed, offset, or otherwise modified such that the bones of the generic virtual skeleton become representative of the bones of the virtual character's interchangeable body part. In addition, or in the alternative, new bones may be added. The result of the modifications is a modified virtual skeleton that includes the unique set of bones representative of the virtual character's interchangeable body part and the generic bones of the remaining generic body parts. FIG. 13 depicts an exemplary modified virtual skeleton in accordance with the present invention. In the embodiment of FIG. 13, the virtual character has an interchangeable legs body part that takes the form of squid-like tentacles 1320. Thus, the generic legs body part of the generic virtual skeleton has been modified to reflect the virtual character's squid-like tentacles. The remainder of the body (i.e., torso 1310) remains generic. The process then proceeds to block 1015 of FIG. 10.

In block 1015, the process defines the animation for the interchangeable body part using the modified virtual skeleton. In some embodiments, the animation may be defined based on inputs by an animator or game designer. In some embodiments, the defined animation controls the bones in the virtual character's interchangeable body part, the generic bones corresponding to the remaining body parts of the generic virtual character, or both. Following the above example, an animator providing information defining an attack animation clip for the virtual character's squid-like legs body part 1320 may provide inputs specifying the animation to control one or more unique tentacle bones. In addition, or in the alternative, the animator may provide inputs specifying how the animation controls one or more generic bones in the generic torso body part 1310. As discussed in more detail below with respect to FIG. 11, by specifying how the animation clip controls the generic bones in generic torso 1310, the animation clip may be layered onto other virtual characters that share the same generic bones. The ability to layer animations defined for one virtual character onto other virtual characters provides an efficient and effective process for smoothly and cohesively animating composite virtual characters.

In block 1020, the process assigns weights to one or more bones in the modified virtual skeleton. In some embodiments, the weights may be assigned based on inputs by an animator or game designer. These weights specify the effect of the animation relative to other animations that may be layered on the virtual character. In some embodiments, this step may be skipped, and no weights are assigned.

The process then returns.

Figure 11:
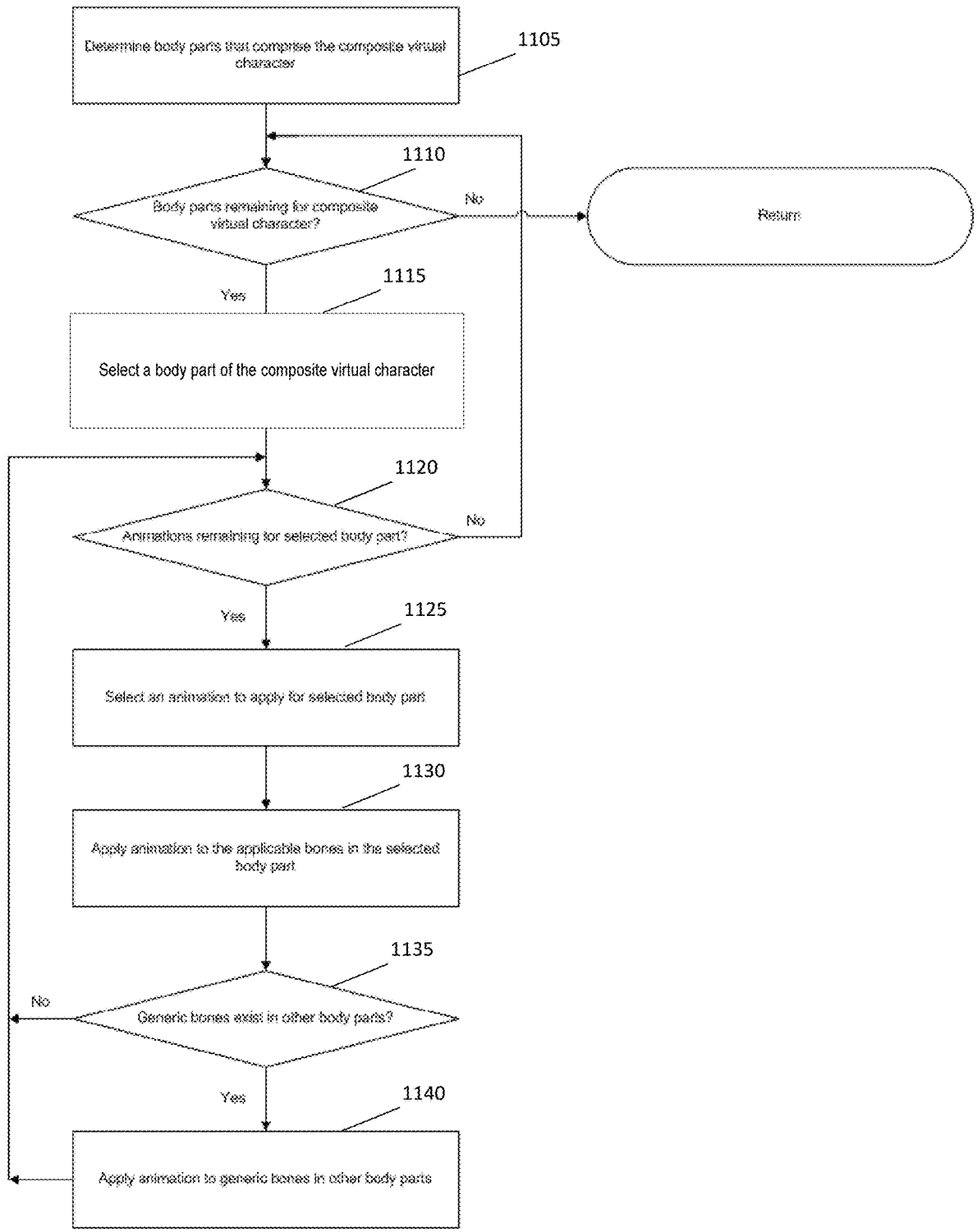
FIG. 11 depicts a flow diagram of a process for animating composite virtual characters in accordance with aspects of the present invention.
Figure 14:
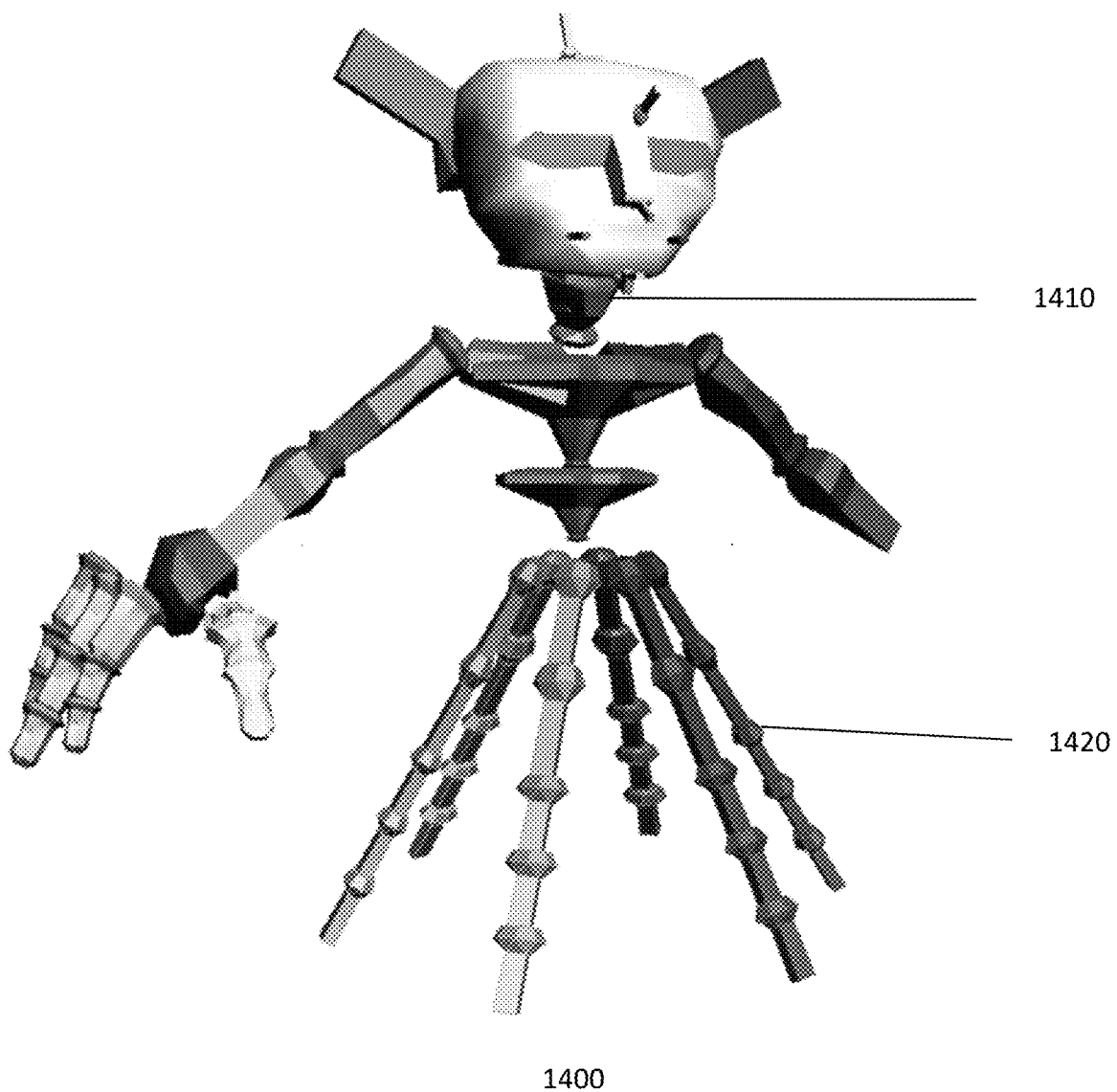
FIG. 14 depicts an exemplary virtual skeleton of a composite virtual character in accordance with the present invention.

FIG. 11 is a flow diagram of a process for animating composite virtual characters in accordance with the present invention. In some embodiments the process is performed by a game platform, for example as discussed with respect to FIG. 1. At block 1105, the process determines the body parts of the virtual characters that comprise the composite virtual character. For example, a composite virtual character may be comprised of two body parts, e.g., a torso body part from a first virtual character and a legs body part from a second virtual character. FIG. 14 depicts an exemplary virtual skeleton of a composite virtual character comprising torso 1410 from a first virtual character and legs 1420 from a second virtual character. In the example of FIG. 14, legs body part of the second virtual character 1420 is squid-like and in the form of tentacles. Torso body part of the first virtual character 1410 is humanoid but one-handed. In some embodiments, these virtual skeletons were defined in accordance with the process defined with respect to FIG. 10.

At block 1110, the process determines whether body parts remain to be processed for the composite virtual character. If no body parts need to be processed for the composite virtual character, the process returns. If body parts need to be processed for the composite virtual character, the process proceeds to block 1115. Referring to the above example of animating the composite virtual character corresponding to the virtual skeleton of FIG. 14, the process may determine that the torso and/or legs body parts of the composite virtual character need to be animated and thus proceed to block 1115. On the other hand, if all body parts have been animated or no animations need to be applied, the process returns.

At block 1115, the process selects a body part of the composite virtual character for processing and determines the defined animations corresponding to the selected body part that need to be applied. Referring again to the example of animating the composite virtual character corresponding to the virtual skeleton of FIG. 14, the process may select for processing the torso body part 1410 of the composite virtual character.

At block 1120, the process determines whether animations defined for the selected body part remain to be applied to the composite virtual character. If no animations corresponding to the selected body part remain to be applied to the composite virtual character, the process returns to block 1110. If animations remain, the process proceeds to step 1125. Continuing the example of animating the composite virtual character corresponding to the virtual skeleton of FIG. 14, the process may determine that an attack animation and run animation defined for torso 1410 of the composite virtual character are to be applied to the composite virtual character. Because the process determines that animations remain to be applied, the process proceeds to block 1125. In some embodiments, the animations defined for a particular body part may be defined in accordance with the process of FIG. 10.

At block 1125, the process selects an animation defined for the selected body part to apply to the composite virtual character. The process then proceeds to block 1130. Following the example of animating the composite virtual character corresponding to the virtual skeleton of FIG. 14, the process may select an attack animation defined for torso 1410 of the composite virtual character.

At block 1130, the process applies the animation defined for the selected body part to the selected body part. In some cases, the animation may apply to all of the bones in the selected body part. In other cases, the animation may affect a subset or none of the bones in the selected body part. The process then proceeds to step 1130. Referring to the example of animating the composite virtual character corresponding to the virtual skeleton of FIG. 14, the process may apply the attack animation defined for torso 1410 of the composite virtual character to one or more applicable bones in torso 1410.

At block 1135, the process determines whether generic bones exist in body parts other than the selected body part. If generic bones exist in the other body parts, the process proceeds to block 1140. If generic bones do not exist in the other body parts, the process returns to block 1120. Following the example of animating the composite virtual character corresponding to the virtual skeleton of FIG. 14, the process may determine that no generic bones exist in the squid-like tentacle legs body part of the composite virtual character. Because generic bones do not exist in the legs body part, the process would proceed to block 1120. On the other hand, if generic bones did exist in the legs body part, the process would proceed to block 1140.

At block 1140, the process applies the animation defined for the selected body part to the generic bones in other body parts. The process then returns to block 1120. Following the above example, the process may apply the animation defined for torso 1410 to generic bones in legs 1420. As discussed above, the animations defined for a particular body part (in this case, the torso body part) may be animated using a virtual skeleton that has the unique set of bones designed for that body part and generic bones for the remaining body parts (in this case, the legs body part). Thus, if generic bones exist in the legs body part of the composite virtual character, the animation may be layered onto those generic bones.

The processes described in FIGS. 10 and 11 allows animations independently defined for one virtual character to be applied to another virtual character, thus providing an improved method for animating composite virtual characters. The processes outlined in FIGS. 10 and 11 are merely exemplary, and it should be appreciated that certain steps may occur in different orders or simultaneously and still conform to the teachings of the invention. For example, in some embodiments, the selection and application of animations to the bones in the selected body part and generic bones in other body parts as described in blocks 1125-1140 may be executed simultaneously for a single pose of the entire composite skeleton.

Although the invention has been discussed with respect to various embodiments, it should be recognized that the invention comprises the novel and non-obvious claims supported by this disclosure.

What is claimed is:

1. A computer-implemented method of animating a composite virtual character, some of whose bones are generic bones of a generic character and some of whose bones are considered specific to other characters, with no animation routines being predefined for the composite virtual character or the generic character but with animation routines being predefined for the other characters, the method comprising:

receiving a definition of a generic virtual skeleton of the generic character, the generic virtual skeleton being comprised of the generic bones;

modifying the generic virtual skeleton by removing some, but not all, of the generic bones and adding at least some first new bones to reflect a skeleton of a first of the other characters, the skeleton of the first of the other characters including both a first set of generic bones and first new bones;

again modifying the generic virtual skeleton by removing some, but not all, of the generic bones and adding at least some second new bones to reflect a skeleton of a second of the other characters, the skeleton of the second of the other characters including both a second set of generic bones and second new bones;

receiving a command for display of a particular animation routine for the composite virtual character, the composite virtual character including at least some of the first set and second set of generic bones and at least some of the first new bones of the skeleton of the first of the other characters and at least some of the generic bones and at least some of the second new bones of the skeleton of the second of the other characters;

generating the particular animation routine for the virtual composite character by:

applying a predefined animation routine for the first of the other characters to bones of the virtual composite character that are the first new bones and the first set of generic bones of the first of the other characters and applying a predefined animation routine for the second of the other characters to the second new bones and the second set of generic bones.

2. The method of claim 1, further comprising applying the predefined animation routine for the first of the other characters to the second set generic bones.

3. The method of claim 2, further comprising applying the predefined animation routine for the second of the other characters to the first set of generic bones.

4. The method of claim 1, wherein the first new bones and the first set of generic bones comprise bones in a torso body part.

5. The method of claim 1, wherein the second new bones and the second set of generic bones comprise bones in a legs body part.

6. The method of claim 1, wherein the first new bones and the first set of generic bones comprise bones in a torso body part and wherein the second new bones and the second set of generic bones comprise bones in a legs body part.

7. The method of claim 1, wherein the predefined animation routine for the first of the other characters is an attack animation routine.

* * * * *